United States Patent [19]

Kreeley

[11] 4,300,748
[45] Nov. 17, 1981

[54] AXIAL FLOW VALVE

[75] Inventor: Bruce K. Kreeley, Bristol, Pa.

[73] Assignee: The Singer Company, Stamford, Conn.

[21] Appl. No.: 207,540

[22] Filed: Nov. 17, 1980

Related U.S. Application Data

[63] Continuation-in-part of Ser. No. 112,682, Jan. 16, 1980, abandoned.

[51] Int. Cl.³ .............................................. F16K 31/126
[52] U.S. Cl. ...................................... 251/5; 251/61.1; 137/489
[58] Field of Search ......................... 251/5, 61.1, 331; 137/489, 860

[56] References Cited

U.S. PATENT DOCUMENTS

| 1,873,138 | 8/1932 | Mitchell | 251/5 |
| 3,836,113 | 9/1974 | Johnson | 251/5 |
| 4,096,211 | 6/1978 | Rameau | 251/5 X |

FOREIGN PATENT DOCUMENTS

| 2801605 | 7/1978 | Fed. Rep. of Germany | 251/61.1 |
| 986047 | 3/1951 | France | 251/5 |

Primary Examiner—Alan Cohan
Attorney, Agent, or Firm—David L. Davis; Robert E. Smith; Edward L. Bell

[57] ABSTRACT

An improved axial flow valve construction includes a valve body and a pair of identical and interchangeable end closure members. The valve body includes a cylindrical opening defining the interior of the valve body, a first plurality of open channels extending from a first end of the valve to the valve body interior and a second plurality of open channels extending from the valve body interior to the second end of the valve body. A flexible tubular sleeve is located within the cylindrical opening. The valve further includes means for providing external communication to the first plurality of open channels and means for providing external communication to the second plurality of open channels. Each of the end closure members includes means for providing a fluid path from either the fluid inlet to the first plurality of open channels or the fluid outlet to the second plurality of open channels, depending upon the orientation of the valve and the end of the valve covered by the end closure member, as well as means for providing external fluid communication to the interior of the sleeve.

10 Claims, 11 Drawing Figures

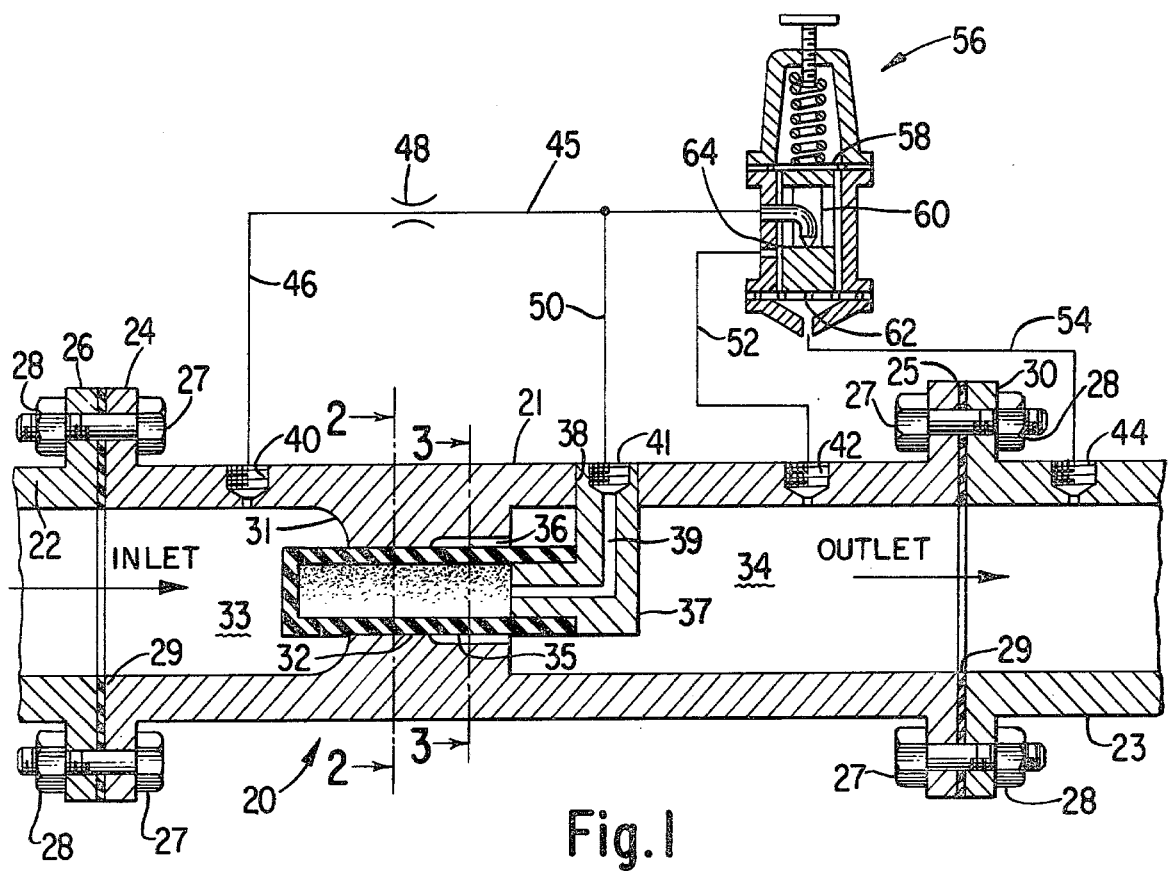
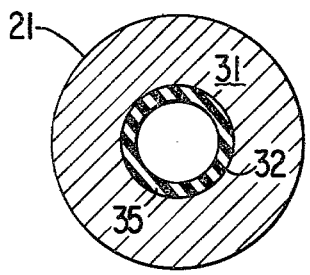
Fig.2
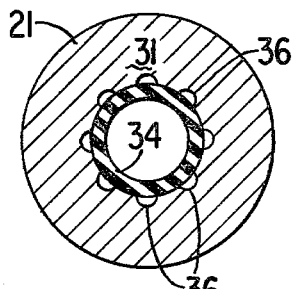
Fig.3
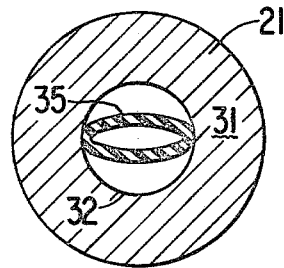
Fig.5
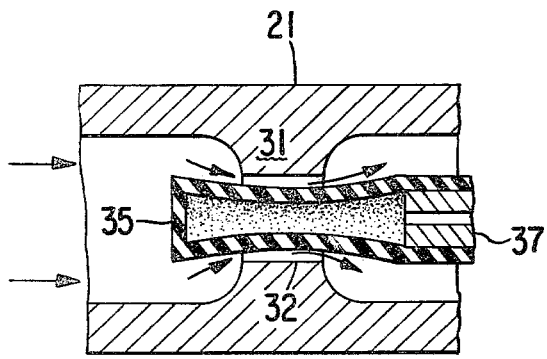
Fig.4
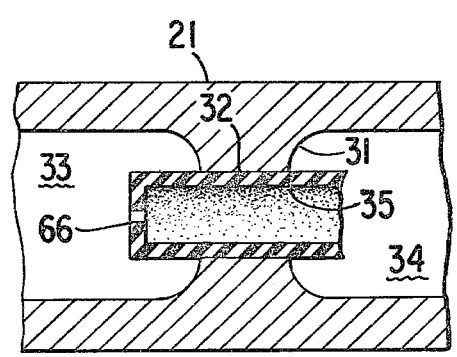
Fig.6

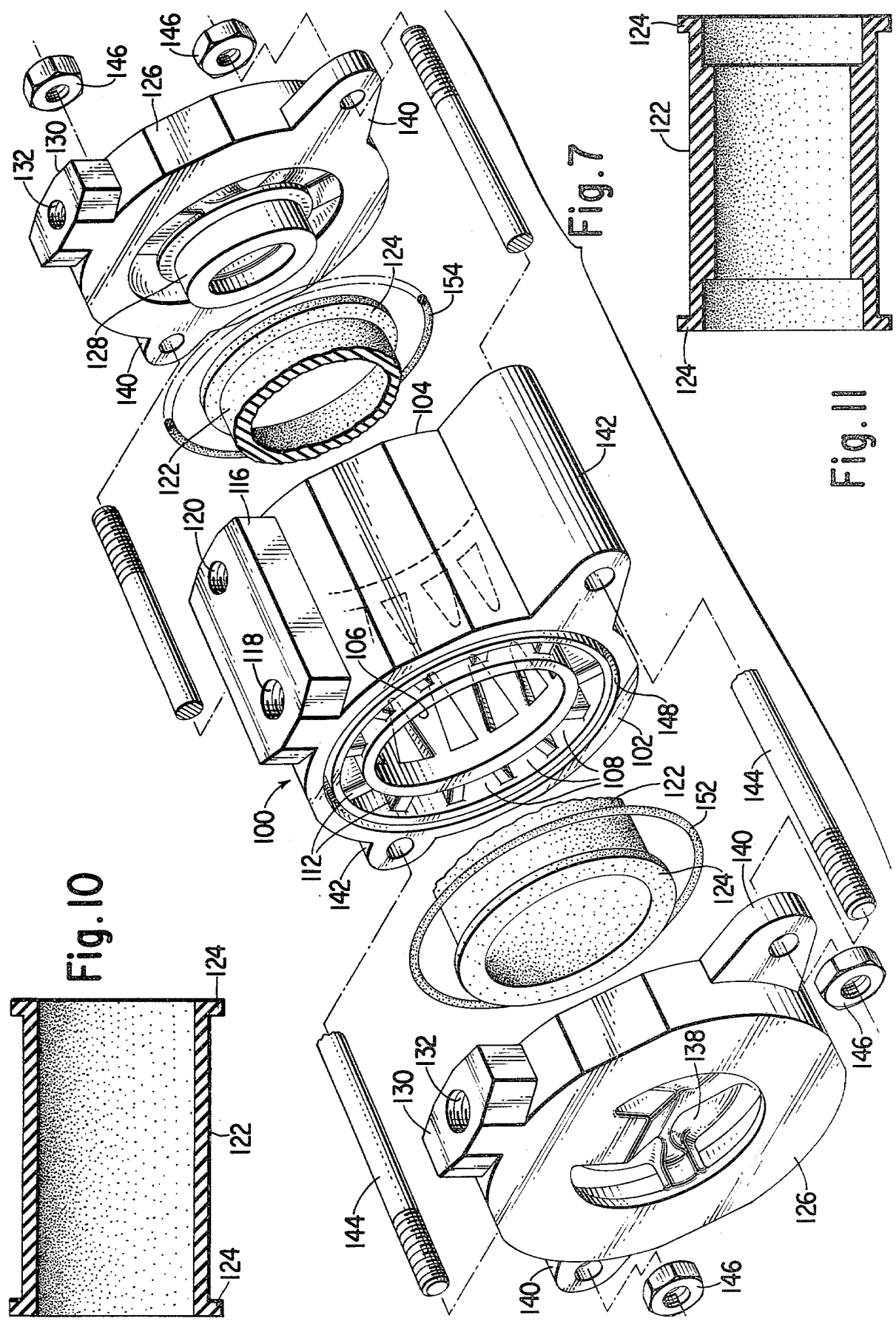

AXIAL FLOW VALVE

DESCRIPTION

This is a continuation-in-part of the co-pending application Ser. No. 112,682, filed Jan. 16, 1980, now abandoned

BACKGROUND OF THE INVENTION

This invention relates to valves and, more particularly, to an axial flow valve that utilizes a flexible tubular throttling member. The use of a flexible member to act as a throttling element in a valve is known. However, in many prior art valves the flexible member is subject to "tension set" that adversely effects the reliability and/or useful life of the valve. Accordingly, one object of this invention is to provide a valve having a flexible member therein that is not adversely effected by tension set.

For obvious reasons, it is desirable that valves be designed such that they can be economically manufactured. Accordingly, another object of this invention is a provide a valve having a flexible member therein that has a simplified design that enables it to be economically manufactured.

For overall general utility in various environments and systems, it is desirable that a valve be capable of being manufactured in various sizes. Accordingly, yet another object of this invention is to provide a valve that can readily be manufactured in various sizes.

It is a further object of this invention to provide a valve wherein shut-off of gaseous flow is bubble tight and shut-off of liquid flow is leak tight.

It is a still further object of this invention to provide an improved valve design wherein the cracking differential pressure is uniform between valves.

SUMMARY OF THE INVENTION

The foregoing and additional objects are attained in accordance with the principles of this invention by providing a valve for regulating the flow of fluid therethrough comprising a valve body having a first end, a second end, a cylindrical opening extending from the first end to the second end, the cylindrical opening defining the interior of the valve body, at least one first open channel extending from the first end to the valve body interior and at least one second open channel extending from the valve body interior to the second end. There is also provided a flexible tubular sleeve located within the cylindrical opening, means for providing a fluid path from a fluid inlet to the first open channel, means for providing a fluid path from the second open channel to a fluid outlet and means for providing external communication to the interior of the sleeve. A manifold mounted on the valve body has a first port providing external communication to the first open channel and a second port providing external communication to the second open channel.

In accordance with an aspect of this invention, the at least one first open channel comprises a first plurality of open channels angularly spaced about the cylindrical opening of the valve body and the at least one second open channel comprises a second plurality of open channels angularly spaced about the cylindrical opening of the valve body.

In accordance with another aspect of this invention the sleeve has an outer diameter substantially equal to the diameter of the cylindrical opening.

In accordance with yet another aspect of this invention, the valve further includes a pair of identical end closure members, each adapted to cover either the first or the second end of the valve body and each of the end closures members comprising both the means for providing a fluid path to its respective first or second open channel and the means for providing external fluid communication to the interior of the sleeve.

In accordance with a further aspect of this invention, the valve body is bidirectionally symmetrical.

BRIEF DESCRIPTION OF THE DRAWINGS

The foregoing will be more readily apparent upon reading the following description in conjunction with the drawings wherein:

FIG. 1 is a longitudinal cross-sectional schematic view of a valve useful in understanding the basic principles of this invention, the valve being shown in combination with a pilot regulator valve to provide pressure control;

FIG. 2 is a cross-section of the valve shown in FIG. 1 taken along the line 2—2 when the valve is closed;

FIG. 3 is a cross-section of the valve shown in FIG. 1 taken along the line 3—3 when the valve is closed;

FIG. 4 illustrates a portion of the valve shown in FIG. 1 when the valve is open;

FIG. 5 is a cross-section of the valve shown in FIG. 1 taken along the line 2—2 when the valve is fully open;

FIG. 6 illustrates a portion of a valve that is a modification of the valve shown in FIG. 1;

FIG. 7 is an exploded perspective view of a preferred embodiment of a valve constructed in accordance with the principles of this invention;

FIG. 10 is a longitudinal section of a first embodiment of the tubular sleeve; and FIG. 11 is a longitudinal section of a second embodiment of the tubular sleeve.

DETAILED DESCRIPTION

Figure 9:
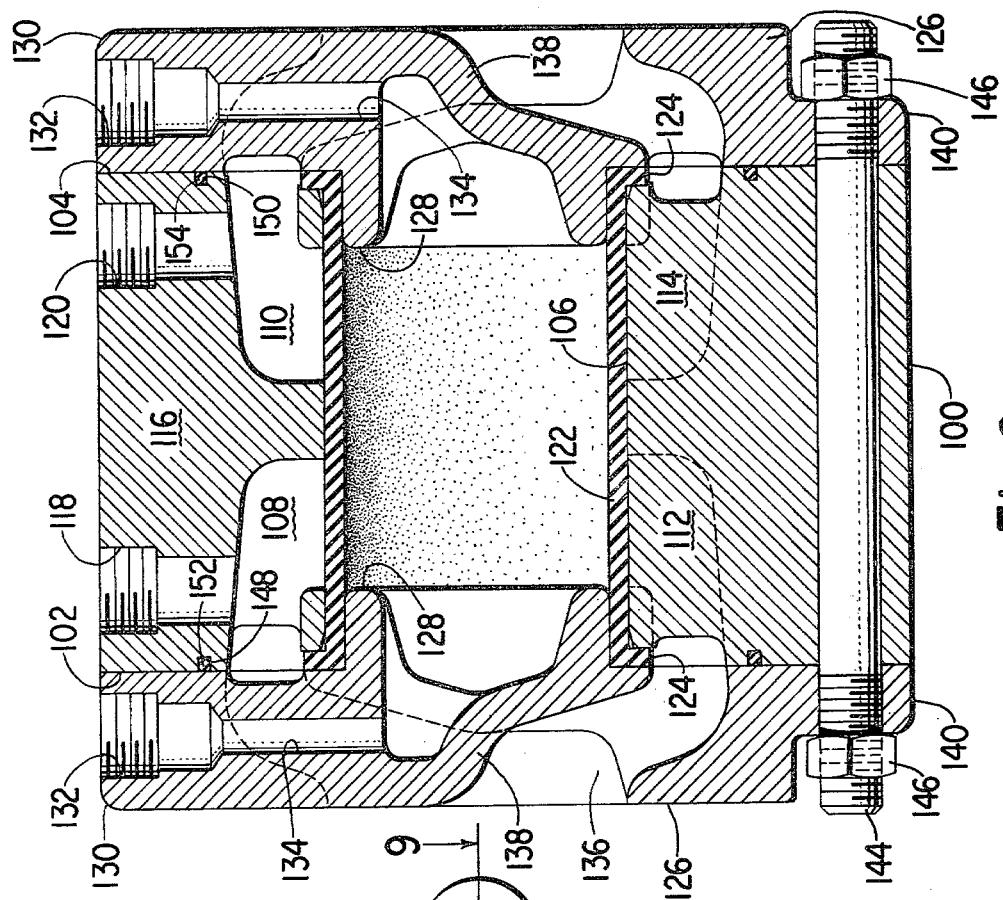
FIG. 9 is a longitudinal section of the entire valve shown in FIG. 7 taken along the line 9—9 in FIG. 8.

Referring now to the drawings, wherein like elements in different figures thereof have the same reference character applied thereto, FIG. 1 illustrates a valve designated generally by the reference character 20 which is useful in understanding the basic principles of this invention. The valve 20 is interposed within a fluid line 22-23. The valve 20 includes a tubular housing 21 having flanged portions 24, 25 at opposite ends thereof. The fluid line 22 has a flanged end portion 26 that is secured to the flanged end portion 24 of the valve 10 by any suitable means, such as bolts 27 and nuts 28. A seal is provided between the flanged end portions 24 and 26 by means of a gasket 29. In like manner, the fluid line 23 has a flanged end portion 30 that is secured to the flanged end portion 25 of the valve 20 by any suitable means such as bolts 27 and nuts 28. A seal is provided between the flanged end portions 25 and 30 by a gasket 29.

An internal reduced diameter portion 31 of the housing 21 is located intermediate the ends of the valve 20. The reduced diameter portion 31 preferably has a substantially constant diameter surface 32 along the length thereof with the constant diameter surface 32 having a longitudinal axis coincident with the longitudinal axis of the tubular housing 21. In the valve shown in FIG. 1, the internal region 33 of the tubular housing 21 to the left of the reduced diameter portion 31 is the inlet region of the valve 20 and the internal region 34 of the tubular housing 21 to the right of the reduced diameter portion 31 is the outlet region of the valve 20.

A tubular flexible throttling element 35 is inserted in the reduced diameter portion 31 and extends into the inlet region 33 and the outlet region 34 of the valve 20. The flexible tubular element 35 is coaxially located within the tubular housing 21 with its longitudinal axis coincident with the longitudinal axis of the tubular housing 21. The flexible tubular element 35 has a substantially constant external diameter along the length thereof that is substantially equal to the reduced diameter surface 32 to provide a close fit between the reduced diameter surface 32 and the external surface of the flexible tubular element 35. A portion of the length of the reduced diameter surface 32 adjacent to the outlet region 34 is preferably slotted as at 36 to provide structural rigidity to the flexible tubular element 35 when the valve 20 is closed. The end of the flexible tubular element 35 extending into the inlet region 33 of the valve 20 is closed and the end of the flexible tubular element 35 extending into the outlet region 34 of the valve 20 is secured to one end of an elbow shaped member 37, the other end of which is secured to an opening 38 in the tubular housing 21. A passageway 39 in the elbow member 37 permits external communication with the interior of the flexible tubular element 35. This interior region of the flexible tubular element 35 is isolated from the fluid path between the inlet region 33 and the outlet region 34. The flexible tubular element 35 may be formed from any suitable elastomeric material such as a combination of natural rubber and nitrile butadiene, styrene butadiene or the like. In operation, the fluid pressure in the interior of the flexible tubular element 35 is controlled externally through the passageway 39. When the pressure within the flexible tubular element 35 is equal to or greater than the fluid pressure in the inlet region 33 of the valve 20, the flexible tubular element 35 expands radially outward against the reduced diameter surface 32 as shown in FIGS. 1 and 2, to close the valve 20, thereby preventing fluid flow from the inlet region 33 to the outlet region 34. However, as the pressure within the flexible tubular element 35 decreases below the pressure in the inlet region 33, the portion of the flexible tubular element 35 extending into the inlet portion 33 will begin to radially contract. This radial contraction will spread along the length of the flexible tubular element 35, as shown in FIG. 4, opening the valve 20 to permit fluid flow from the inlet region 33 to the outlet region 34. The radial contraction of the flexible tubular element 35 will continue to further open the valve 20 as the pressure within the flexible tubular element 35 continues to decrease below the pressure level in inlet region 33, thereby increasing fluid flow. Thus, the magnitude of the pressure differential between the inlet region of the valve 20 and the interior of the flexible tubular element 35 controls the fluid flow rate between the inlet region 33 and the outlet region 34. When the valve 20 is fully opened to provide maximum fluid flow, the cross-section of the flexible tubular element 35 is similar to that illustrated in FIG. 5. The flexible tubular element 35 is in compression during radial contraction. During the compression loading as shown in FIG. 5, a large percentage of the flexible tubular element 35 remains in compression. Also, since elastomers exhibit less compression set than tension set, the flex life and therefore the reliability of the throttling action of the flexible tubular element 35 is significantly greater than it would be if the element 35 was subjected to predominantly tension loads.

As will be apparent to those skilled in the art, the valve 20 as described above can be used in many ways. For example, the valve 20 may be operated as a relief valve, an on/off valve, a check valve or the like.

FIG. 1 illustrates the use of the valve 20 in a pressure control system. For this purpose, the valve 20 includes a manifold portion which includes a port 40, a port 41 and a port 42. The port 40 is connected through a line 46, a restrictor 48 and a line 45 to the orifice 64 of a conventional pilot regulator 56. This pilot regulator 56 may be a type "Z-SC" Model 150 regulator, manufactured and sold by the American Meter Division of The Singer Company. The port 41 communicates with the interior of the flexible tubular element 35 by way of the passageway 39 and is coupled through a line 50 to the line 45 and the port 42 is coupled through a line 52 to the interior chamber of the regulator 56. As is well known, the regulator 56 includes diaphragms 58 and 62 coupled by a yoke 60. Pressure from the line 50 is applied between the diaphragms 58 and 62, pressure from the line 45 is applied at the orifice 64 and downstream pressure is applied to the underside of the diaphragm 62 by a line 54 coupled to a port 44 in the fluid line 23.

In operation, upstream pressure flows through the port 40 and through the restrictor 48 and line 50 back to the port 41 and the interior of the flexible tubular element 35. The pressure in the line 45 is applied to the inlet of the pilot regulator 56. Downstream pressure is applied by the line 54 to the pilot regulator 56. If the downstream pressure satisfies the set point of the pilot regulator 56, the pressure within the flexible tubular element 32 will equal the upstream pressure in the inlet region 33 and the valve 20 will be closed as shown in FIGS. 1 and 2. As the downstream pressure lowers, the pilot regulator will progressively open the orifice 64 and cause a presure drop across the restrictor 48 which is proportional to the degree of pilot opening. The resulting reduced pressure in the line 45 causes a corresponding reduction in pressure within the flexible tubular element 35, causing the valve 20 to open to permit fluid flow from the inlet region 33 to the outlet region 34. As will be apparent, the degree of contraction of the flexible tubular element 35, and therefore the magnitude of fluid flow between the inlet 33 and outlet 34 will be proportional to the reduction in downstream pressure from the set point of the pilot regulator 56.

In a modification of the system shown in FIG. 1, the restrictor 48 can be eliminated and the same function obtained by an opening 66 in the flexible tubular element 35 that communicates the interior of the flexible tubular element 35 with the inlet region 33 of the valve 20 in a manner as illustrated in FIG. 6.

Figure 8:
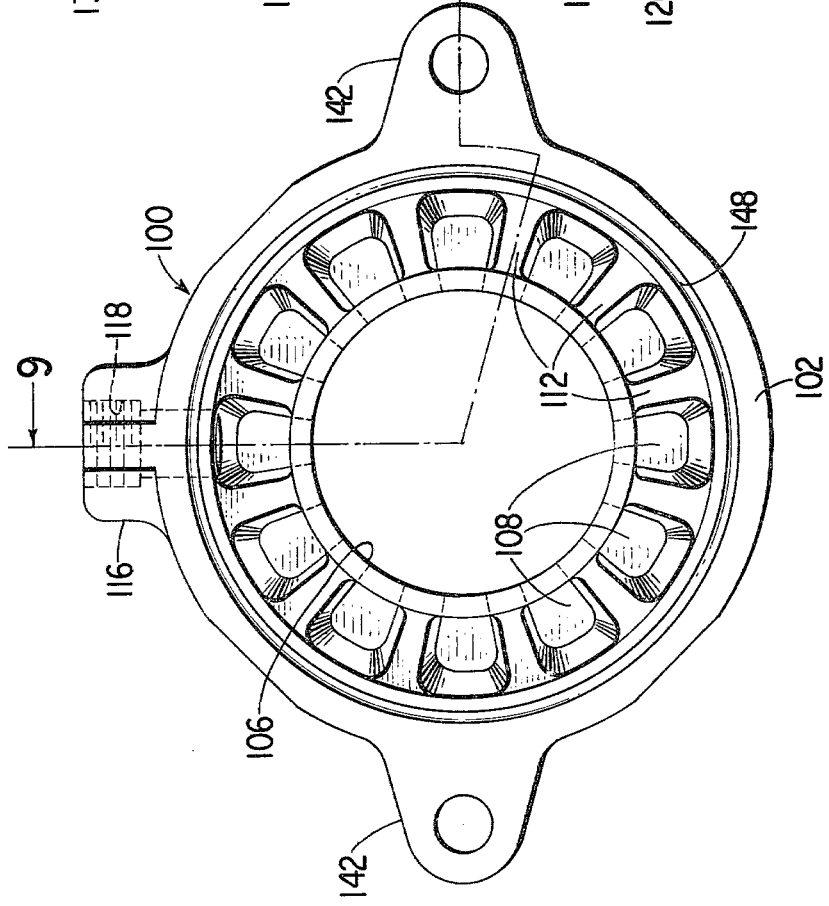
FIG. 8 is an end view of the valve body of the valve shown in FIG. 7.

The foregoing description was illustrative of the principles of this invention. FIGS. 7–11 depict a preferred embodiment of a valve constructed in accordance with these principles. As shown in FIGS. 7–9, a preferred valve construction includes a valve body designated generally by the reference numeral 100. The valve body 100 has a first end 102, a second end 104 and is formed with a cylindrical opening 106 extending from the first end 102 to the second end 104. The cylindrical opening 106 thus defines the interior of the valve body 100. Also formed within the valve body 100 is a first plurality of open channels 108 extending from the first end 102 to the interior of the valve body 100, and a second plurality of open channels 110 extending from the interior of the valve body 100 to the second end 104. The first plurality of open channels 108 are angularly spaced about the cylindrical opening 106 and are separated by a first plurality of ribs 112. Thus, as is clear from FIG. 9, each of the first plurality of open channels 108 enters the valve body 100 from the first end 102 in a direction which is generally parallel to the longitudinal axis of the cylindrical opening 106 and then bends before entering the cylindrical opening 106. It is noted that the channels 108 are rounded and angled, thus providing a cavitation-resistant feature. The second plurality of open channels 110 are identical in form to the channels 108, being separated by a plurality of ribs 114. A feature of this valve design is that the valve body 100 may be bidirectionally symmetrical so that it may be inserted in a fluid flow line in either direction. However, to optimize gas flow performance, it may be preferable that the valve not be symmetrically configured. In any event, the improved valve design makes the valve body 100 easier to manufacture, and provides the additional economical advantage that identical end closures may be provided, as will be described in further detail hereinafter.

Mounted on the valve body 100 is a manifold 116 which includes a first port 118 which provides external communication to the first plurality of open channels 108. The manifold 116 also has a second port 120 which provides external communication to the second plurality of open channels 110.

The valve 100 further includes a flexible tubular sleeve 122 which is located within the cylindrical opening 106. The outer diameter of the sleeve 122 is substantially equal to the diameter of the cylindrical opening 106. Preferably, the sleeve 122 is formed with a flange 124 at each end thereof, for reasons to be described hereinafter.

The valve 100 further includes a pair of identical and interchangeable end closure members 126 each of which is adapted to cover either the first end 102 or the second end 104 of the valve body 100. The end closure member 126 includes a boss 128 adapted to extend into the interior of the sleeve 122. The outer configuration of the boss 128 conforms to the inner configuration of the sleeve 122 so as to provide a snug fit therewith. The interior of the boss 128 is hollow and the end closure member 126 also includes a manifold 130 having a port 132 and a conduit 134 extending from the port 132 to the hollow interior of the boss 128. Thus, the end closure member 126 includes means providing external fluid communication to the interior of the sleeve 122.

The end closure member 126 also includes means for providing a fluid path to either the channels 108 or the channels 110. Accordingly, the end closure member 126 is formed with passageways 136 which extend from the side opposite the boss 128 and fan outwardly to meet the open channels 108 or 110. A spider 138 defines these passageways, provides support for the boss 128 and provides structure through which the conduit 134 may pass.

To hold the valve components together, the end closure member 126 is formed with a pair of diametrically opposed ears 140 and the valve body 100 is also formed with a pair of diametrically opposed ears 142. The ears 140, 142 are formed with longitudinal openings therethrough which are adapted to be aligned when the valve is assembled. A pair of end threaded rods 144 then pass through these longitudinal openings and are capped by nuts 146.

When the valve is assembled, the flanged ends 124 of the sleeve 122 provide a seal between the sleeve interior and the open channels 108, 110. To seal the open channels 108, 110 from the exterior of the valve, the valve body 100 is formed with annular grooves 148 and 150 on its first and second ends 102 and 104, respectively. These annular grooves are concentric with the cylindrical opening 106 and are spaced outward from the open channels 108 and 110. A pair of O-rings 152 and 154 fit in the annular grooves 148 and 150, respectively, to provide this outer seal.

FIG. 10 shows a first embodiment of the tubular sleeve 122 and FIG. 11 shows a second embodiment of the tubular sleeve 122. The difference between these two embodiments is that in the embodiment of FIG. 11, the sleeve 122 has a thickened middle portion, this being the region of the sleeve 122 which extends between the bosses 128 of the end closure members 126. The sleeve shown in FIG. 11 is adapted for use with higher pressure flows than the sleeve shown in FIG. 10.

When the valve shown in FIGS. 7–9 is utilized in a pressure control system such as that illustrated in FIG. 1, with the left side of the valve as shown in FIGS. 7 and 9 being considered the inlet and the right side of the valve as shown in FIGS. 7 and 9 being considered the outlet, the inlet pressure is monitored through the port 118 and the outlet pressure is monitored through the port 120. The pressure within the interior of the sleeve 122 is controlled through either of the ports 132 in the end closure members 126, the other of the ports 132 being capped. The valve operates in accordance with the discussion given above with respect to FIGS. 1–5.

Although not expressly shown, the end closure members 126 are adapted for connection to inlet and outlet conduits.

The valve described herein possesses a number of distinct advantages. For example, the valve is adapted for either liquid, gas or slurry flow, the large flow passages allowing the slurry particles to pass therethrough. The sealing area of the valve is upstream of the cavitation-prone areas and the design of the flow passages provide a cavitation-resistant feature. The straight design of the sleeve resists failure thereof. Also, the straight design of the sleeve cooperates with the straight bore of the cylindrical opening 106 to provide a concentric sealing land for bubble and leak tight flow shut-off, as well as uniform cracking differential pressure. The valve as described above possesses great ease of assembly and disassembly. The bolts, or end threaded rods, are located outside the valve and are not subject to corrosion. Because of the interchangeability of the end closure members, economy of manufacture is achieved. The valve is also adapted for a casting operation with a minimum of machining being required. Further, the ends of the valve are interchangeable (i.e., it is bidirectionally symmetrical) and thus the valve may be used for either direction of fluid flow therethrough.

Accordingly, there has been disclosed an improved construction of an axial flow valve. It is understood that the above-described embodiment is merely illustrative of the application of the principles of this invention. Numerous other embodiments may be devised by those skilled in the art without departing from the spirit and scope of this invention, as defined by the appended claims.

I claim:

1. A valve for regulating the flow of fluid therethrough comprising:
   a valve body having a first end, a second end, a cylindrical opening extending from said first end to said second end, said cylindrical opening defining the interior of said valve body, at least one first open channel extending from said first end to said valve body interior and at least one second open channel extending from said valve body interior to said second end;
   a flexible tubular sleeve located within said cylindrical opening;
   means for providing a fluid path from a fluid inlet to said at least one first open channel;
   means for providing a fluid path from said at least one second open channel to a fluid outlet;
   means for providing external fluid communication to the interior of said sleeve;
   a manifold mounted on said valve body and having a first port providing external communication to said at least one first open channel and a second port providing external communication to said at least one second open channel; and
   an end closure member adapted to cover said first end of said valve body and including both said means for providing a fluid path to said at least one first open channel and said means for providing external fluid communication to the interior of said sleeve.

2. The valve according to claim 1 wherein said at least one first open channel comprises a first plurality of open channels angularly spaced about the cylindrical opening of the valve body and said at least one second open channel comprises a second plurality of open channels angularly spaced about the cylindrical opening of the valve body.

3. The valve according to claim 1 wherein said sleeve has an outer diameter substantially equal to the diameter of said cylindrical opening.

4. The valve according to claim 3 further including control means coupled to said means for providing external fluid communication to the sleeve interior and to said first port for controlling the pressure differential between the fluid inlet and the sleeve interior so as to control fluid flow through the valve from the fluid inlet to the fluid outlet.

5. The valve according to claim 4 wherein said sleeve responds to an interior pressure greater than the fluid inlet pressure for expanding radially outward to seal at least said first open channel from said valve body interior so as to prevent fluid flow between said first and second open channels and said sleeve responds to an interior pressure less than the fluid inlet pressure for contracting radially inward to allow fluid flow between said first and said second open channels through said valve body interior, the magnitude of the pressure differential controlling the fluid flow rate between said first and said second open channels.

6. The valve according to claim 1 wherein said valve body is bidirectionally symmetrical.

7. The valve according to claims 1 or 6 further including another end closure member identical to said end closure member and adapted to cover said second end of said valve body, said another end closure member comprising both the means for providing a fluid path to said at least one second open channel and means for providing external fluid communication to the interior of said sleeve.

8. The valve according to claim 7 wherein each of said end closure members comprises a boss adapted to extend into the interior of said sleeve, the outer configuration of said boss conforming to the inner configuration of said sleeve so as to provide a snug fit therewith, and said means for providing external communication to the interior of said sleeve includes a manifold having a port and a conduit extending from said port to said boss.

9. The valve according to claim 7 further including sealing means at said first and second ends of said valve body intermediate said valve body and each of said end closure member for providing at each end a first seal between the sleeve interior and the respective open channel and a second seal between the respective open channel and the exterior of the valve.

10. The valve according to claim 9 wherein said valve body includes an annular groove on each of its first and second ends, each of said annular grooves being concentric with said cylindrical opening and spaced outward from the respective open channel, and said sealing means includes at each end of said valve body an outwardly extending flange on said sleeve to provide said first seal and an O-ring adapted to fit in said annular groove to provide said second seal.

* * * * *